United States Patent
Nakajima

(10) Patent No.: US 10,787,957 B2
(45) Date of Patent: Sep. 29, 2020

(54) WASTE GATE VALVE DEVICE INCLUDING A PROJECTING PORTION TO REDUCE RATTLING FOR A TURBOCHARGER

(71) Applicant: TOYOTA JIDOSHA KABUSHIKI KAISHA, Toyota-shi (JP)

(72) Inventor: Takeshi Nakajima, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 212 days.

(21) Appl. No.: 15/889,697

(22) Filed: Feb. 6, 2018

(65) Prior Publication Data
US 2018/0223727 A1 Aug. 9, 2018

(30) Foreign Application Priority Data
Feb. 7, 2017 (JP) .................................. 2017-020712

(51) Int. Cl.
*F02B 37/18* (2006.01)
*F01D 17/10* (2006.01)
(52) U.S. Cl.
CPC .......... *F02B 37/186* (2013.01); *F01D 17/105* (2013.01); *F05D 2220/40* (2013.01); *Y02T 10/144* (2013.01)
(58) Field of Classification Search
CPC .................... F02B 37/183–186; F01D 17/105
See application file for complete search history.

(56) References Cited

U.S. PATENT DOCUMENTS

| 10,443,486 | B2* | 10/2019 | Huh ....................... F02B 37/18 |
| 2012/0055154 | A1* | 3/2012 | Ebert .................... F01D 17/105 60/602 |
| 2012/0216534 | A1* | 8/2012 | Werstat ................ F01D 17/105 60/611 |
| 2014/0345273 | A1 | 11/2014 | Yamaguchi et al. |
| 2014/0366531 | A1* | 12/2014 | Segawa ................ F02B 37/186 60/602 |
| 2015/0125272 | A1* | 5/2015 | Mack .................... F01D 17/105 415/145 |

FOREIGN PATENT DOCUMENTS

| CN | 102414418 A | 4/2012 |
| CN | 104136735 A | 11/2014 |
| CN | 104302887 A | 1/2015 |
| JP | 2012-67698 | 4/2012 |
| JP | 5995989 | 9/2016 |
| WO | WO 2010/135104 A2 | 11/2010 |

* cited by examiner

*Primary Examiner* — Laert Dounis
(74) *Attorney, Agent, or Firm* — Oblon, McClelland, Maier & Neustadt, L.L.P.

(57) ABSTRACT

A waste gate valve device for a turbocharger includes a drive rod having a first end connected to an actuator, an elastic member sandwiched between a link arm and the drive rod or between a support member and the drive rod, and a projecting portion at a position closer to a connecting pin than the elastic member or a position farther from the connecting pin than the elastic member in one of the drive rod and the support member sandwiching the elastic member or one of the drive rod and the link arm sandwiching the elastic member, the projecting portion protruding toward the other one of the drive rod and the support member and the other one of the drive rod and the link arm.

6 Claims, 5 Drawing Sheets

WASTE GATE VALVE DEVICE INCLUDING A PROJECTING PORTION TO REDUCE RATTLING FOR A TURBOCHARGER

INCORPORATION BY REFERENCE

The disclosure of Japanese Patent Application No. 2017-020712 filed on Feb. 7, 2017 including the specification, drawings and abstract is incorporated herein by reference in its entirety.

BACKGROUND

1. Technical Field

The present disclosure relates to a waste gate valve device for a turbocharger.

2. Description of Related Art

Japanese Unexamined Patent Application Publication No. 2012-67698 (JP 2012-67698 A) discloses a waste gate valve device in which a rotary shaft of a valve body opening and closing a waste gate port extends to the outside of a turbine housing through the turbine housing. A link arm is fixed to a part of the rotary shaft protruding to the outside of the turbine housing. A columnar connecting pin is fixed to the link arm such that the central axis of the connecting pin is parallel to the central axis of the rotary shaft. A drive rod connected to an actuator has a tip connected to the link arm in a state where the connecting pin is inserted into an insertion hole disposed at the tip. As a result, in the waste gate valve device, the link arm rotates about the rotary shaft when the drive rod is driven by the actuator, and then the valve body opens and closes the waste gate port.

SUMMARY

When the drive rod and the link arm have a gap between themselves at a part where the drive rod and the link arm are connected to each other via the connecting pin, the drive rod rattles and the drive rod vibrates. Conceivable in this regard is suppressing the rattling by biasing the drive rod by pinching an elastic member between the drive rod and the link arm.

The following problems arise in a case where the rattling is to be suppressed by the pinching of the elastic member. In the first place, the drive rod and the link arm have a relatively small gap between themselves, and thus material selection entails significant constraints when the elastic member capable of exerting an appropriate biasing force by being pinched in the relatively small gap is to be realized.

In a case where rattling is to be suppressed by the gap between the drive rod and the link arm being forced to become larger and an elastic member that has a relatively large size being disposed so that the constraints described above can be handled, the rattling of the drive rod relatively escalates on the contrary in a case where the elastic member is weakened and no appropriate biasing force can be obtained.

An aspect of the present disclosure relates to a waste gate valve device for a turbocharger. The turbocharger includes a turbine housing and the turbine housing includes a waste gate port. The waste gate valve device includes a valve body opening and closing the waste gate port and a rotary shaft disposed to protrude to an outside of the turbine housing through the turbine housing. The rotary shaft is configured to rotate the valve body. The waste gate valve device includes a link arm fixed to the rotary shaft outside the turbine housing, a connecting pin fixed to the link arm and having a central axis parallel to a central axis of the rotary shaft, a support member fixed to the connecting pin, an actuator, and a drive rod. The drive rod has a first end connected to the actuator and a second end having an insertion hole. The connecting pin is inserted into the insertion hole in the drive rod, and the second end of the drive rod is connected to the link arm via the connecting pin in a state where the second end of the drive rod is pinched by the support member and the link arm to rotate with respect to the link arm. The waste gate valve device includes an elastic member sandwiched between the link arm and the drive rod or between the support member and the drive rod. The elastic member is configured to bias the drive rod in an extending direction of the central axis of the connecting pin. The waste gate valve device includes a projecting portion provided at a position closer to the connecting pin than the elastic member or a position farther from the connecting pin than the elastic member in one of the drive rod and the support member sandwiching the elastic member or one of the drive rod and the link arm sandwiching the elastic member, the projecting portion protruding toward the other one of the drive rod and the support member and the other one of the drive rod and the link arm.

According to the aspect of the present disclosure, a gap between a pair of members pinching the elastic member is narrowed by the projecting portion. Accordingly, even when the degree of freedom of the design of the elastic member for obtaining an appropriate biasing force is ensured with greater ease by the gap between the members at the part where the elastic member is installed being widened, the relative movable ranges of the members in the extending direction of the central axis of the connecting pin can be regulated by the projecting portion. Therefore, the magnitude of rattling is suppressed by the projecting portion even when the elastic member is weakened.

In the waste gate valve device according to the aspect of the present disclosure, the projecting portion may be integrally configured as a part of one of the support member, the link arm, and the drive rod.

According to the aspect of the present disclosure, no additional component needs to be prepared to constitute the projecting portion, and thus an increase in the number of components can be suppressed. Forming the projecting portion on the surface of the member by casting, forming the projecting portion on the surface of the member by cutting, or the like is conceivable as a method by which the projecting portion is molded integrally with the member.

In the waste gate valve device according to the aspect of the present disclosure, the projecting portion may be fitted into a rod body of the drive rod and may be disposed at a part of a cylindrical bush, the cylindrical bush constituting the insertion hole and the part protruding from the rod body.

According to the aspect of the present disclosure, the dimension of the projecting portion can be adjusted by the length of the cylindrical bush. In the waste gate valve device according to the aspect of the present disclosure, the elastic member may be a disk spring sandwiched between the support member and the link arm along with the drive rod with the connecting pin inserted into the disk spring.

According to the aspect of the present disclosure, rattling can be suppressed over the entire circumference of the perimeter of the connecting pin by the disk spring. In the waste gate valve device according to the aspect of the present disclosure, the projecting portion may have an annular shape about the connecting pin.

According to the aspect of the present disclosure, the magnitude of rattling at every position in the circumferential direction of the disk spring can be suppressed by the projecting portion. In the waste gate valve device according to the aspect of the present disclosure, the elastic member may be sandwiched between the drive rod and the support member and between the drive rod and the link arm alike, and the projecting portion protruding toward the other one of the drive rod and the support member and the other one of the drive rod and the link arm may be provided at the position closer to the connecting pin than the elastic member or the position farther from the connecting pin than the elastic member in one of the drive rod and the support member sandwiching the elastic member and one of the drive rod and the link arm sandwiching the elastic member.

When the elastic member is sandwiched between the drive rod and the support member and between the drive rod and the link arm alike as in the aspect of the present disclosure, the drive rod is biased by each elastic member to be apart from the support member and the link arm alike. Accordingly, sliding resistance can be reduced compared to a case where the drive rod and the support member slide or a case where the drive rod and the link arm slide.

In a case where a configuration is adopted in which the elastic member is sandwiched between the drive rod and the support member and between the drive rod and the link arm alike as described above, projecting portions as described above being disposed between the drive rod and the support member and between the drive rod and the link arm alike is preferable. According to the aspect of the present disclosure, the magnitude of rattling is suppressed by the projecting portion even when the elastic member is weakened between the drive rod and the support member or between the drive rod and the link arm.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
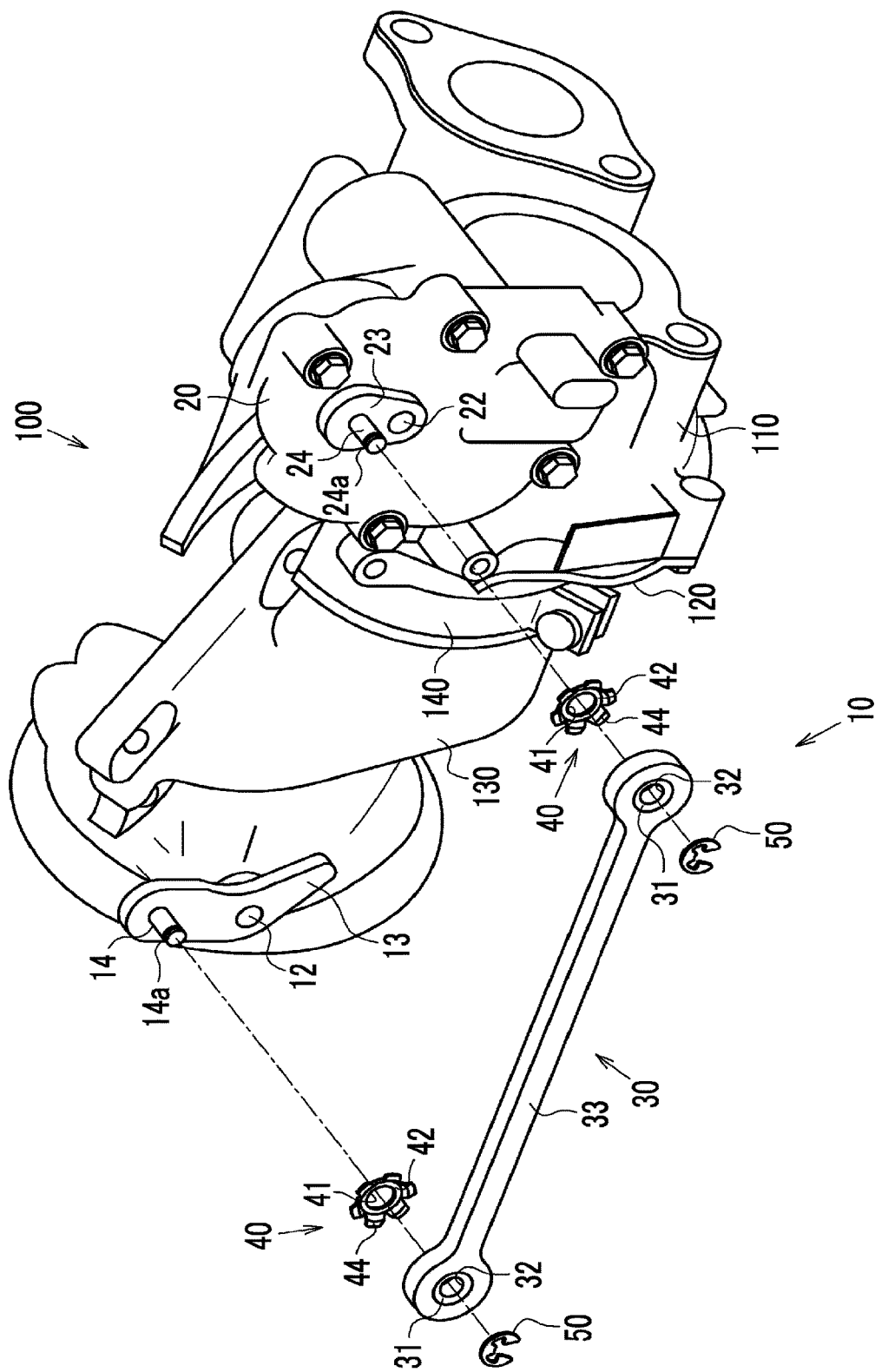
FIG. 1 is a perspective view of a turbocharger in which a part of a waste gate valve device is shown in an exploded manner.

Hereinafter, an embodiment of a waste gate valve device for a turbocharger will be described with reference to FIGS. 1 to 4. As illustrated in FIG. 1, a turbocharger 100 equipped with a waste gate valve device 10 is configured as a combination of a compressor housing 110, a bearing housing 120, and a turbine housing 130.

The bearing housing 120 supporting a shaft connecting a compressor wheel accommodated in the compressor housing 110 and a turbine wheel accommodated in the turbine housing 130 to each other is fastened to the compressor housing 110 by a bolt. The turbine housing 130 is assembled to the bearing housing 120 by a clamp 140.

Figure 2:
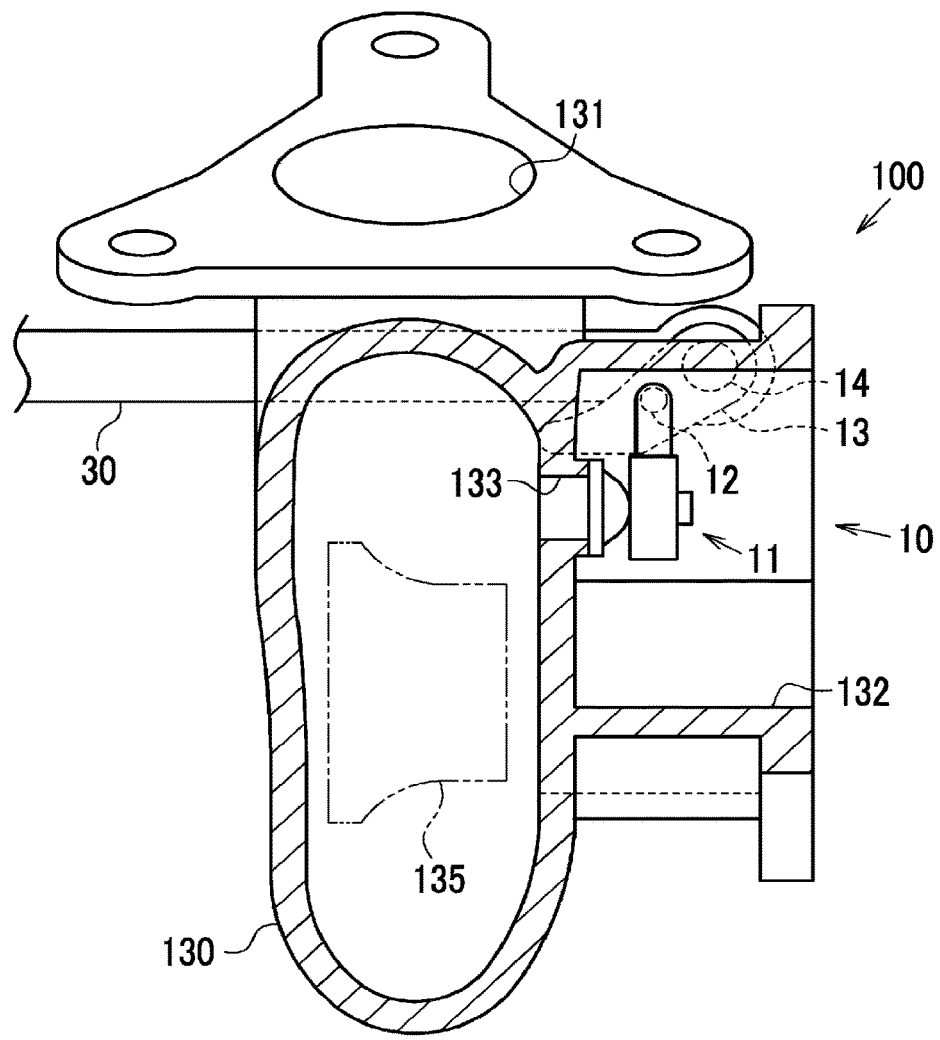
FIG. 2 is a partial sectional view of a turbine housing.

As illustrated in FIG. 2, a turbine wheel 135 is accommodated in the turbine housing 130 and a scroll passage 131 extending to surround the turbine wheel 135 is formed in the turbine housing 130.

Exhaust gas blown to the turbine wheel 135 through the scroll passage 131 is discharged from the turbine housing 130 to an exhaust passage through a discharge passage 132.

In the turbocharger 100, the turbine wheel 135 is rotated by the exhaust gas passing through the scroll passage 131 being blown to the turbine wheel 135. When the turbine wheel 135 rotates, the compressor wheel connected to the turbine wheel 135 via the shaft rotates. As a result, turbocharging of intake air is performed.

As illustrated in FIG. 2, a waste gate port 133 is disposed in the turbine housing 130. The waste gate port 133 is a passage connecting the scroll passage 131 and the discharge passage 132 to each other by bypassing the turbine wheel 135.

As illustrated in FIG. 2, the waste gate valve device 10 has a valve body 11 blocking the waste gate port 133 formed in the turbine housing 130. The waste gate port 133 is opened and closed by the valve body 11 by the valve body 11 being driven.

When the valve body 11 is apart from the waste gate port 133 and the waste gate port 133 is open, the exhaust gas passing through the scroll passage 131 flows into the discharge passage 132 through the waste gate port 133 and the amount of the exhaust gas blown to the turbine wheel 135 decreases. Accordingly, in a case where the waste gate port 133 is open, the rotation of the turbine wheel 135 and the compressor wheel is suppressed and the turbocharging is suppressed.

The valve body 11 is fixed to a first end of a rotary shaft 12 extending to the outside of the turbine housing 130 through the turbine housing 130. The rotary shaft 12 is rotatably supported by the turbine housing 130. The valve body 11 opens and closes the waste gate port 133 by rotating about the rotary shaft 12.

As illustrated in FIGS. 1 and 2, a waste gate side link arm 13 is fixed to a second end of the rotary shaft 12 positioned outside the turbine housing 130. A columnar waste gate side connecting pin 14 is fixed at a position apart from the part of the waste gate side link arm 13 to which the rotary shaft 12 is fixed. The central axis of the waste gate side connecting pin 14 is parallel to the central axis of the rotary shaft 12.

As illustrated in FIG. 1, an actuator 20 for driving the valve body 11 is fixed to the compressor housing 110. The actuator 20 has a built-in motor and a rotary shaft 22 is driven by the motor. An actuator side link arm 23 is fixed to the rotary shaft 22. A columnar actuator side connecting pin 24 is fixed at a position apart from the part of the actuator side link arm 23 to which the rotary shaft 22 is fixed. The central axis of the actuator side connecting pin 24 is parallel to the central axis of the rotary shaft 22.

In the waste gate valve device 10, the actuator side link arm 23 and the waste gate side link arm 13 are connected to each other via a drive rod 30. Insertion holes 32 are disposed in both end portions of the drive rod 30. In the drive rod 30, cylindrical bushes 31 with a hardness higher than the hardness of a rod-shaped rod body 33 are respectively attached to both end portions of the rod body 33 widened in a disk shape. As a result, in the drive rod 30, the inner peripheral surfaces of the bushes 31 constitute the insertion holes 32.

The waste gate side connecting pin 14 and the actuator side connecting pin 24 have the same dimension. The diameter of the insertion holes 32 is slightly larger than the diameter of the connecting pins 14, 24. A surface treatment for an increase in hardness is applied to each of the connecting pins 14, 24 and the hardness of the connecting pins 14, 24 is increased up to the hardness equal to the hardness of the bushes 31.

A first end of the drive rod 30 is assembled to the waste gate side link arm 13 such that the waste gate side connecting pin 14 is inserted into the insertion hole 32 and is retained by an E ring 50 as a support member fitted into a groove 14a disposed in a tip portion of the waste gate side connecting pin 14.

A second end of the drive rod 30 is assembled to the actuator side link arm 23 such that the actuator side connecting pin 24 is inserted into the insertion hole 32 and is retained by an E ring 50 fitted into a groove 24a disposed in a tip portion of the actuator side connecting pin 24.

Disk springs 40 as elastic members biasing the drive rod 30 in the extending direction of the central axes of the connecting pins 14, 24 are sandwiched between the first end of the drive rod 30 and the waste gate side link arm 13 and between the second end of the drive rod 30 and the actuator side link arm 23, respectively.

Figure 3:
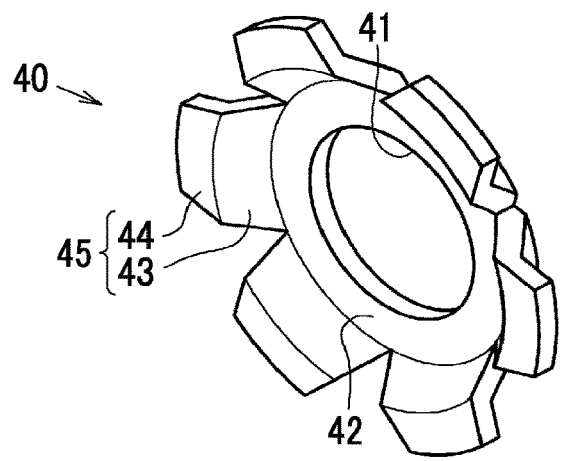
FIG. 3 is a perspective view of a disk spring as a component constituting the waste gate valve device.

As illustrated in FIG. 3, the disk spring 40 is a disk spring that has external teeth and an insertion hole 41 is disposed at the center of the disk spring 40. Six external teeth 45 are disposed outside an annular inner peripheral side part 42 where the insertion hole 41 is disposed such that the six external teeth 45 are equally spaced in a circumferential direction. An outer peripheral side part 44 and an inclined part 43 constitute each of the external teeth 45. The outer peripheral side part 44 is positioned on an outer peripheral side of the disk spring 40. The inclined part 43 extends at an angle to the inner peripheral side part 42 and connects the outer peripheral side part 44 and the inner peripheral side part 42 to each other.

As illustrated in FIG. 1, the disk springs 40 are respectively attached to the connecting pins 14, 24 along with the drive rod 30 such that the connecting pins 14, 24 are respectively inserted into the insertion holes 41, the outer peripheral side parts 44 are positioned on the drive rod 30 side, and the inner peripheral side parts 42 are positioned on the link arms 13, 23 side.

Figure 4:
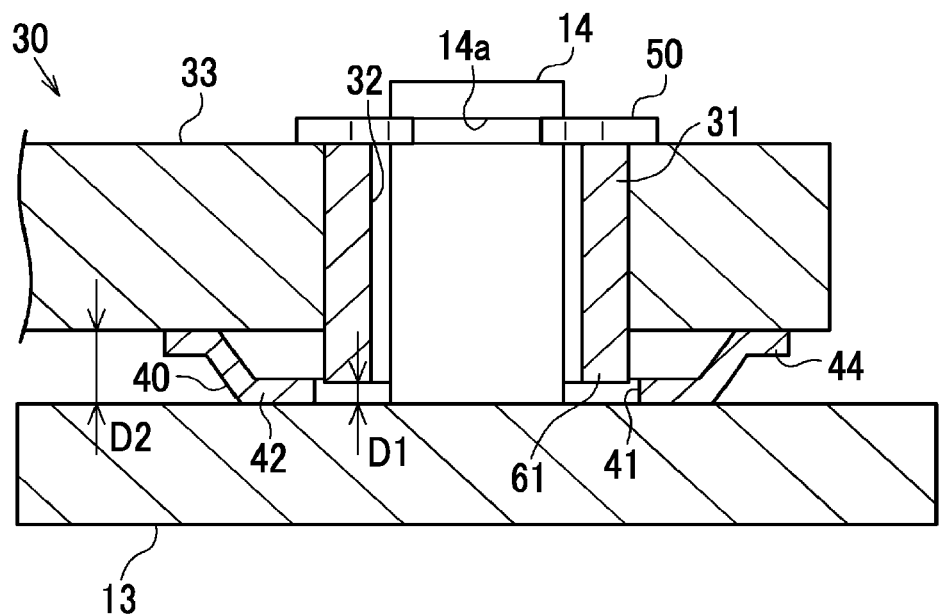
FIG. 4 is a sectional view of a connecting part of the waste gate valve device where a drive rod and a waste gate side link arm are connected to each other.

As illustrated in FIG. 4, the outer peripheral side part 44 of the disk spring 40 abuts against the drive rod 30. In FIG. 4, solely the connecting part where the waste gate side link arm 13 and the drive rod 30 are connected to each other is shown in an enlarged manner for convenience of description. However, the connecting pins 14, 24 have the same dimension and the bushes 31 and the disk springs 40 have the same dimension on the waste gate side and the actuator side alike. Accordingly, the configuration of the connecting part on the actuator side and the configuration of the connecting part on the waste gate side are identical to each other, and thus illustration of the connecting part on the actuator side will be omitted herein.

As illustrated in FIG. 4, the length of the bush 31 is longer than the thickness of the rod body 33, that is, the dimension of the rod body 33 in the up-down direction in FIG. 4. The bush 31 protrudes from the rod body 33 toward the link arms 13, 23. The inner diameter of the insertion hole 41 of the disk spring 40 is larger than the diameter of the bush 31. The bush 31 has a tip inserted into the insertion hole 41 of the disk spring 40.

The disk springs 40 are sandwiched between the drive rod 30 and the link arms 13, 23 in an elastically deformed state and the inner peripheral side parts 42 of the disk springs 40 abut against the link arms 13, 23. As a result, the disk springs 40 bias the drive rod 30 by a restoring force such that the drive rod 30 is pressed against the E rings 50 and suppresses rattling of the drive rod 30.

In the waste gate valve device 10, the bushes 31 protrude from the rod body 33 toward the link arms 13, 23 and are inserted into the insertion holes 41 of the disk springs 40 as described above. As a result, projecting portions 61 that the tips of the bushes 31 constitute are disposed on the drive rod 30. In other words, the projecting portions 61 that are disposed at positions of the drive rod 30 closer to the connecting pins 14, 24 than the disk springs 40 and protrude toward the link arms 13, 23 are disposed in the waste gate valve device 10.

The gaps between the drive rod 30 and the link arms 13, 23 are narrowest at the parts where the projecting portions 61 are disposed because the projecting portions 61 are disposed. Specifically, gaps D1 between the drive rod 30 and the link arms 13, 23 are smaller than gaps D2 between the drive rod 30 and the link arms 13, 23 at parts other than the parts where the projecting portions 61 are disposed such as the parts where the disk springs 40 are disposed.

As illustrated in FIG. 4, the diameter of the insertion hole 32 is slightly larger than the diameter of the connecting pins 14, 24. Accordingly, the drive rod 30 is connected in a relatively rotatable manner to the waste gate side link arm 13 via the waste gate side connecting pin 14 and is connected in a relatively rotatable manner to the actuator side link arm 23 via the actuator side connecting pin 24.

The action of the waste gate valve device 10 will be described below. When the rotary shaft 22 is driven by the actuator 20 and the actuator side link arm 23 rotates about the rotary shaft 22, the drive force of the actuator 20 is transmitted to the waste gate side link arm 13 via the drive rod 30. Then, the waste gate side link arm 13 rotates about the rotary shaft 12 and the valve body 11 fixed to the rotary shaft 12 is driven to approach the waste gate port 133 or move away from the waste gate port 133. In the waste gate valve device 10, the waste gate port 133 can be opened and closed by the actuator 20 being driven in this manner.

The material of the disk spring 40 is selected and the dimension of the disk spring 40 is designed such that the rattling of the drive rod 30 can be suppressed within an allowable range and the sliding resistance of the drive rod 30 and the link arms 13, 23 can be kept within an allowable range when the actuator 20 is driven as described above.

The waste gate valve device 10 described above is capable of achieving the following effects.

(1) In general, a drive rod and a link arm have a relatively small gap between themselves, and thus material selection entails significant constraints when an elastic member is to be realized in the form of, for example, a disk spring capable of exerting an appropriate biasing force by being pinched in the relatively small gap. In a case where rattling is to be suppressed by the gap between the drive rod and the link arm being forced to become larger and an elastic member that has a relatively large size being disposed so that the constraints described above can be handled, the rattling of the drive rod relatively escalates on the contrary in a case where the elastic member is weakened and no appropriate biasing force can be obtained.

In the waste gate valve device 10 described above, in contrast, the gaps between the drive rod 30 and the link arms 13, 23 are narrowed by the projecting portions 61. Accordingly, even when the degree of freedom of the design of the disk springs 40 for obtaining an appropriate biasing force is ensured with greater ease by the gaps between the drive rod 30 and the link arms 13, 23 at the parts where the disk springs 40 are installed being widened, the relative movable ranges of the drive rod 30 and the link arms 13, 23 in the extending direction of the central axes of the connecting pins 14, 24 can be regulated by the projecting portions 61. Therefore, the magnitude of the rattling is suppressed by the projecting portions 61 even when the disk springs 40 are weakened.

In other words, according to the configuration described above, constraints on the design of the disk spring 40 can be suppressed by the gap at the part where the disk spring 40 is installed being widened and the escalation of the rattling that occurs in a case where the disk spring 40 is weakened can also be suppressed.

(2) Since the relative movable ranges of the drive rod 30 and the link arms 13, 23 in the extending direction of the central axes of the connecting pins 14, 24 are regulated by the projecting portions 61, the deformation amount of the disk spring 40 is limited to a smaller range than in a case where the projecting portion 61 is not disposed. Accordingly, the deformation amount of the disk spring 40 is suppressed and the disk spring 40 is less likely to be weakened than in a case where the projecting portion 61 is not disposed and the deformation amount of the disk spring 40 is not limited.

(3) The tips of the cylindrical bushes 31 protrude from the rod body 33 and the tips of the bushes 31 constitute the projecting portion 61. Accordingly, the dimension of the projecting portion 61 can be adjusted with ease by the length of the bush 31 being adjusted.

(4) The disk springs 40 are adopted as the elastic members biasing the drive rod 30 and the disk springs 40 are disposed in a state where the connecting pins 14, 24 are inserted into the insertion holes 41 of the disk springs 40. Accordingly, the rattling can be suppressed over the entire circumference of the perimeters of the connecting pins 14, 24 by the disk springs 40.

(5) The projecting portions 61 are formed by the tips of the cylindrical bushes 31 and are formed in an annular shape about the connecting pins 14, 24. Accordingly, the magnitude of the rattling at every position in the circumferential direction of the disk spring 40 can be suppressed by the projecting portions 61.

Figure 5:
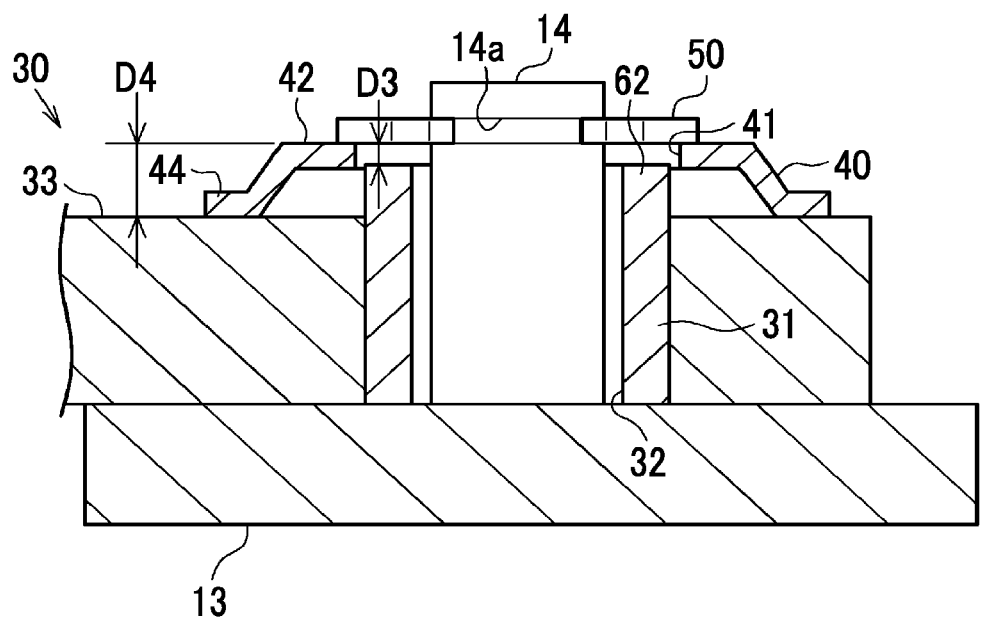
FIG. 5 is a sectional view of a connecting part of a waste gate valve device according to another example where a drive rod and a waste gate side link arm are connected to each other.

The embodiment described above can also be carried out after being appropriately modified as follows. The disk springs 40 may be assembled to the connecting pins 14, 24 along with the drive rod 30 to suppress the rattling of the drive rod 30 by biasing the drive rod 30. For example, the disk spring 40 may also be sandwiched between the E ring 50 and the drive rod 30 as illustrated in FIG. 5. Herein, the disk springs 40 are respectively attached to the connecting pins 14, 24 along with the drive rod 30 such that the outer peripheral side parts 44 are positioned on the drive rod 30 side, the inner peripheral side parts 42 are positioned on the E rings 50 side, and the connecting pins 14, 24 are respectively inserted into the insertion holes 41.

Even in this case, the length of the bush 31 is longer than the thickness of the rod body 33, that is, the dimension of the rod body 33 in the up-down direction in FIG. 5 as illustrated in FIG. 5. Herein, however, the bush 31 protrudes from the rod body 33 toward the E rings 50. The tip of the bush 31 is inserted into the insertion hole 41 of the disk spring 40.

The disk springs 40 are sandwiched between the drive rod 30 and the E rings 50 in an elastically deformed state, the outer peripheral side parts 44 abut against the drive rod 30, and the inner peripheral side parts 42 of the disk springs 40 abut against the E rings 50. As a result, the disk springs 40 bias the drive rod 30 by a restoring force such that the drive rod 30 is pressed against the link arms 13, 23 and suppresses the rattling of the drive rod 30.

In this case, the bushes 31 protrude from the rod body 33 toward the E rings 50 that are the support members and are inserted into the insertion holes 41 of the disk springs 40. As a result, projecting portions 62 that the tips of the bushes 31 constitute are disposed on the drive rod 30. In other words, in the waste gate valve device 10, the projecting portions 62 are disposed that are disposed at positions of the drive rod 30 closer to the connecting pins 14, 24 than the disk springs 40 and protrude toward the support members.

As illustrated in FIG. 5, the gap between the drive rod 30 and the E ring 50 is narrowest at the part where the projecting portion 62 is disposed because the projecting portion 62 is disposed. Specifically, a gap D3 between the drive rod 30 and the E ring 50 at the part where the projecting portion 62 is disposed is smaller than a gap D4 at the part where the disk spring 40 is pinched.

In the configuration described above, the gap between the drive rod 30 and the E ring 50 is narrowed by the projecting portion 62. Accordingly, the same effects as (1) to (5) of the embodiment described above can be achieved.

The disk springs 40 may be arranged on both surfaces of the drive rod 30 as well. In other words, the disk springs 40 may be arranged between the drive rod 30 and the link arms 13, 23 and between the drive rod 30 and the E rings 50 alike.

Figure 6:
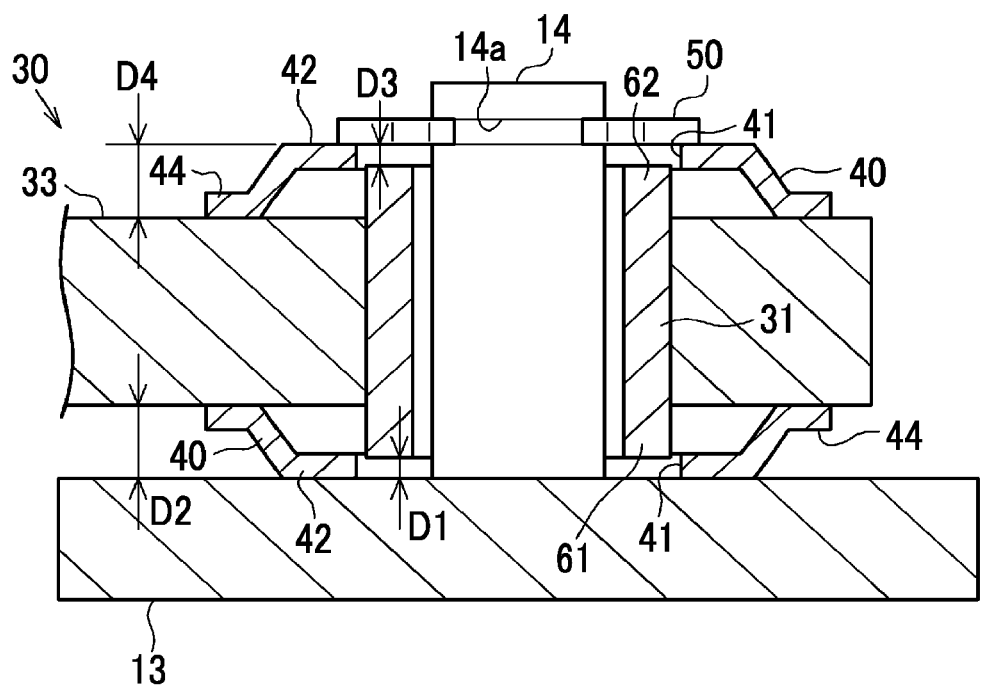
FIG. 6 is a sectional view of a connecting part of a waste gate valve device according to another example where a drive rod and a waste gate side link arm are connected to each other.

In this case, each of the disk springs 40 is arranged such that each of the outer peripheral side parts 44 of the disk springs 40 is positioned on the drive rod 30 side as illustrated in FIG. 6. Even in this case, the length of the bush 31 is longer than the thickness of the rod body 33, that is, the dimension of the rod body 33 in the up-down direction in FIG. 6. The bush 31 protrudes from the rod body 33 toward the link arms 13, 23 and the E rings 50 alike. In other words, the part of the bush 31 protruding from the rod body 33 toward the link arms 13, 23 constitutes the projecting portion 61 and the part of the bush 31 protruding from the rod body 33 toward the E rings 50 constitutes the projecting portion 62.

As a result, the gaps between the drive rod 30 and the link arms 13, 23 are narrowest at the parts where the projecting portions 61 are disposed. In other words, the gaps D1 between the drive rod 30 and the link arms 13, 23 are smaller than the gaps D2 between the drive rod 30 and the link arms 13, 23 at the parts where the disk springs 40 are disposed. The gap between the drive rod 30 and the E ring 50 is narrowest at the part where the projecting portion 62 is disposed. In other words, the gap D3 between the drive rod 30 and the E ring 50 at the part where the projecting portion 62 is disposed is smaller than the gap D4 at the part where the disk spring 40 is pinched.

In a case where the configuration described above is adopted, the drive rod 30 is biased by each of the disk springs 40, such that the drive rod 30 is apart from the link arms 13, 23 and the E rings 50 alike, by the restoring force of the disk springs 40 sandwiched between the drive rod 30 and the link arms 13, 23 and between the drive rod 30 and the E rings 50 alike. Accordingly, in a case where the two disk springs 40 are given the same characteristics, the biasing forces of the two disk springs 40 are in balance with each other and the gap D2 and the gap D4 are the same as each other as illustrated in FIG. 6. In other words, the drive rod 30 is positioned in the middle between the link arms 13, 23 and the E rings 50.

Accordingly, the area of a sliding part can be reduced and sliding resistance can be reduced compared to a configuration in which the drive rod 30 and the E ring 50 slide as illustrated in FIG. 4 and a configuration in which the drive rod 30 and the link arms 13, 23 slide as illustrated in FIG. 5.

The gaps between the drive rod 30 and the link arms 13, 23 are narrowed by the projecting portions 61 and the gaps between the drive rod 30 and the E rings 50 are narrowed by the projecting portions 62. Accordingly, the same effects as (1) to (5) of the embodiment described above can be achieved on the link arms 13, 23 side and the E rings 50 side alike.

An example has been described in which the insertion hole 32 of the drive rod 30 is formed by the bush 31 being attached to the rod body 33 and the parts of the bushes 31 protruding from the rod body 33 constitute the projecting portions 61 and the projecting portions 62. However, the bush 31 does not necessarily have to be disposed in the drive rod 30. In other words, the insertion hole 32 may be disposed in the rod body 33 instead. In this case, wear being suppressed by the inner peripheral surface of the insertion hole 32 being cured by a surface treatment is preferable.

In this case, the projecting portions 61, 62 may be molded integrally with the drive rod 30. In other words, the projecting portions 61, 62 may be configured as parts of the rod body 33 itself. With the configuration described above, no additional component needs to be prepared to constitute the projecting portions 61, 62, and thus an increase in the number of components can be suppressed. Forming the projecting portions 61, 62 on the surface of the drive rod 30 by casting, forming the projecting portions 61, 62 on the surface of the drive rod 30 by cutting, or the like is conceivable as a method by which the projecting portions 61, 62 are molded integrally with the drive rod 30.

The projecting portions narrowing the gaps between the drive rod 30 and the link arms 13, 23 and the gaps between the drive rod 30 and the E rings 50 may be disposed at positions farther from the connecting pins 14, 24 than the disk springs 40.

Figure 7:
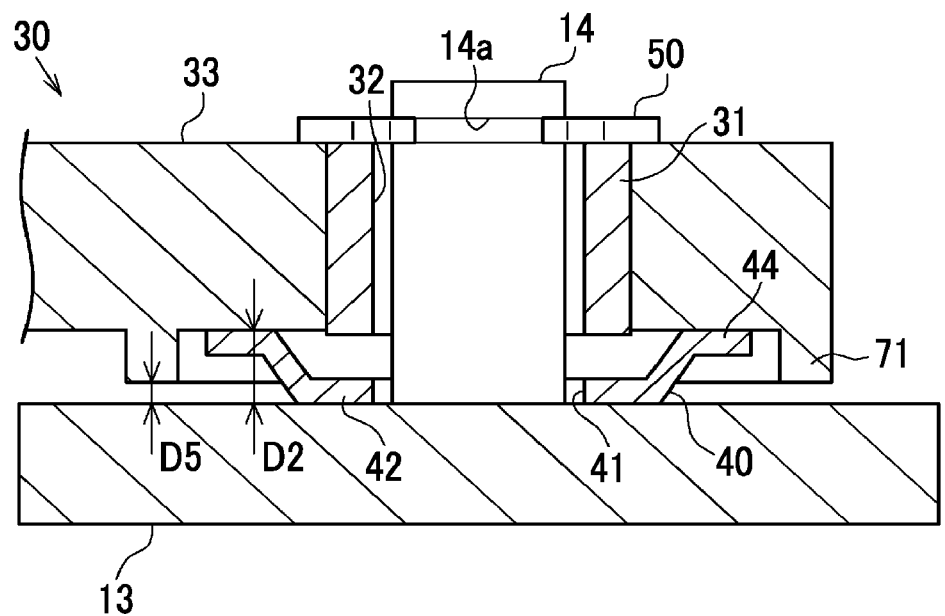
FIG. 7 is a sectional view of a connecting part of a waste gate valve device according to another example where a drive rod and a waste gate side link arm are connected to each other.

For example, an annular projecting portion 71 surrounding the perimeter of the disk spring 40 may be disposed on the drive rod 30 as illustrated in FIG. 7. The projecting portions 71 are disposed at positions in the drive rod 30 farther from the connecting pins 14, 24 than the disk springs 40 and protrude toward the link arms 13, 23.

As a result, the gaps between the drive rod 30 and the link arms 13, 23 are narrowest at the parts where the projecting portions 71 are disposed. In other words, gaps D5 between the projecting portions 71 and the link arms 13, 23 are smaller than the gaps D2 between the drive rod 30 and the link arms 13, 23 at the parts where the disk springs 40 are disposed.

In the configuration described above, the gaps between the drive rod 30 and the link arms 13, 23 are narrowed by the projecting portions 71. Accordingly, the same effects as (1), (2), (4), and (5) of the embodiment described above can be achieved.

Figure 8:
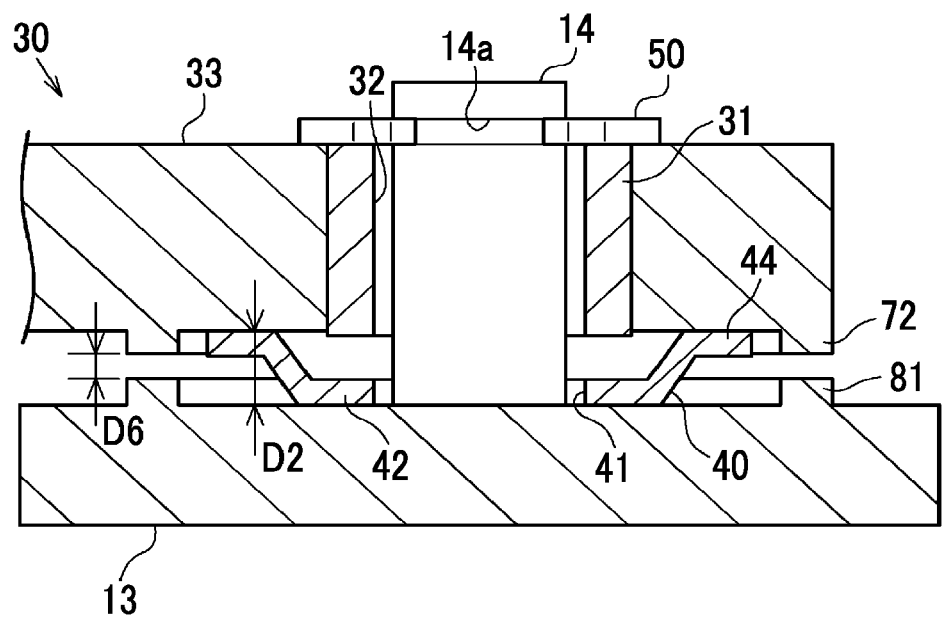
FIG. 8 is a sectional view of a connecting part of a waste gate valve device according to another example where a drive rod and a waste gate side link arm are connected to each other.

A configuration can also be adopted in which a gap is narrowed by projecting portions protruding from both members facing each other across the disk spring 40 as illustrated in FIG. 8. In the configuration illustrated in FIG. 8, projecting portions 71 protruding toward the link arms 13, 23 are disposed on the drive rod 30 and projecting portions 81 protruding toward the drive rod 30 are disposed at the positions of the link arms 13, 23 facing the projecting portions 71. The gaps between the drive rod 30 and the link arms 13, 23 are narrowest at the parts where the projecting portions 72 and the projecting portions 81 face each other. In other words, gaps D6 between the projecting portions 72 and the projecting portions 81 are smaller than the gaps D2 between the drive rod 30 and the link arms 13, 23 at the parts where the disk springs 40 are disposed. In other words, the gaps between the drive rod 30 and the link arms 13, 23 are narrowed by the projecting portions 72 and the projecting portions 81. Accordingly, even with the configuration described above, the same effects as (1), (2), (4), and (5) of the embodiment described above can be achieved.

Although the E rings 50 have been exemplified as the support members, the support members are not limited to the E rings insofar as the support members are capable of retaining the drive rod 30 by being fixed to the connecting pins 14, 24. For example, the support members may also be retaining pins retaining the drive rod 30 by being inserted into the positions of the connecting pins 14, 24 where the grooves 14a, 24a are disposed.

When the range in which the support member and the drive rod 30 face each other is expanded by the support member being replaced with a plate larger in diameter than the E ring 50, the disk spring 40 can be disposed between the support member and the drive rod 30 and a projecting portion can be disposed outside the disk spring 40. In other words, a projecting portion protruding toward the drive rod 30 can be disposed at a position in the support member farther from the connecting pin 14 than the disk spring 40 or a projecting portion protruding toward the support member can be disposed at a position in the drive rod 30 farther from the connecting pin 14 than the disk spring 40.

Figure 9:
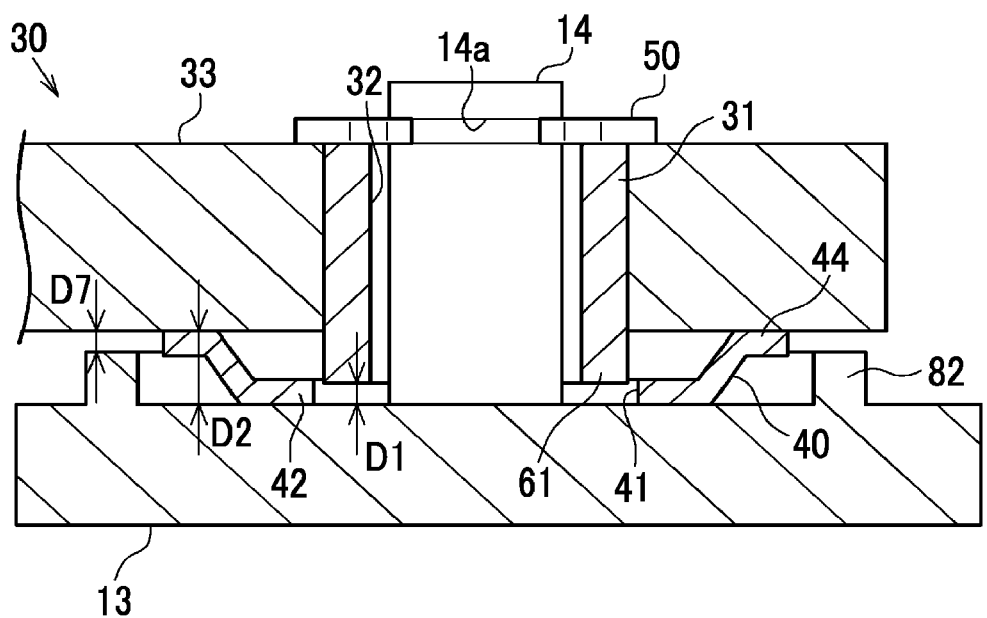
FIG. 9 is a sectional view of a connecting part of a waste gate valve device according to another example where a drive rod and a waste gate side link arm are connected to each other.

A configuration in which a projecting portion is disposed at a position closer to the connecting pin 14 than the disk spring 40 and a configuration in which a projecting portion is disposed at a position farther from the connecting pin 14 than the disk spring 40 may be adopted in combination as illustrated in FIG. 9, too. In the example illustrated in FIG. 9, projecting portions 82 protruding toward the drive rod 30 are disposed at positions in the link arms 13, 23 farther from the connecting pin 14 than the disk springs 40 and the bushes 31 protrude from the rod body 33 toward the link arms 13, 23 to constitute the projecting portions 61 as in the embodiment described above. The projecting portion 82 is formed in an annular shape to surround the perimeter of the disk spring 40.

As a result, the gaps between the drive rod 30 and the link arms 13, 23 are narrowed at the part where the projecting portion 61 is disposed and at the part where the projecting portion 82 is disposed. In other words, the gaps D1 between the projecting portions 61 and the link arms 13, 23 are smaller than the gaps D2 between the drive rod 30 and the link arms 13, 23 at the parts where the disk springs 40 are disposed and gaps D7 between the projecting portions 82 and the link arms 13, 23 are smaller than the gap D2 as well. In a case where the configuration described above is adopted, the movable range of the drive rod 30 can be regulated by the projecting portion 82 as well as the projecting portion 61 and the rattling of the drive rod 30 can be suppressed.

A projecting portion may also be disposed at a position overlapping a part of the disk spring 40 in the radial direction of the connecting pins 14, 24. For example, in the configuration illustrated in FIG. 4, the tip of the projecting portion 61 may face the inner peripheral side part 42 of the disk spring 40 and a gap corresponding to the gap D1 may be formed between the projecting portion 61 and the inner peripheral side part 42. In this case, the projecting portion 61 and the inner peripheral side part 42 of the disk spring 40 abut against each other when the disk spring 40 is compressed, and thus relative displacement of the drive rod 30 and the link arms 13, 23 in the extending direction of the central axes of the connecting pins 14, 24 is regulated and the rattling of the drive rod 30 is suppressed. In the configuration illustrated in FIG. 9, for example, the tip of the projecting portion 82 may face the outer peripheral side part 44 of the disk spring 40 and a gap corresponding to the gap D7 may be formed between the projecting portion 82 and the outer peripheral side part 44. In this case, the projecting portion 82 and the outer peripheral side part 44 of the disk spring 40 abut against each other when the disk spring 40 is compressed, and thus relative displacement of the drive rod 30 and the link arms 13, 23 in the extending direction of the central axes of the connecting pins 14, 24 is regulated and the rattling of the drive rod 30 is suppressed.

Although the disk spring 40 is a disk spring that has the external teeth, the disk spring 40 may also be a disk spring that has internal teeth or a toothless annular disk spring. The elastic member is not limited to a disk spring. The elastic member may also be a coil spring, rubber, and so on. The elastic member may not have an annular shape surrounding the connecting pin, either. For example, a plurality of elastic members may be disposed on each of the perimeters of the connecting pins 14, 24.

The projecting portion may not have an annular shape. The same effects as in the embodiment described above can be achieved insofar as a gap is narrowed by the projecting portion protruding. Accordingly, a plurality of projecting portions may be disposed in a dispersed manner on the perimeters of the connecting pins 14, 24 in place of the annular projecting portions surrounding the perimeters of the connecting pins 14, 24. A single projecting portion may be disposed on the perimeters of the connecting pins 14, 24, too.

A configuration may also be adopted in which the projecting portion as described above is disposed at either one of the connecting part on the waste gate side and the connecting part on the actuator side. The actuator is not particularly limited insofar as the actuator is capable of driving the drive rod 30. For example, the actuator may also be a diaphragm-type actuator performing the driving by using air pressure or a hydraulic cylinder-type actuator performing the driving by using hydraulic pressure.

What is claimed is:

1. A waste gate valve device for a turbocharger, the turbocharger including a turbine housing and the turbine housing including a waste gate port, the waste gate valve device comprising:
   a valve body opening and closing the waste gate port;
   a rotary shaft disposed to protrude to an outside of the turbine housing through the turbine housing, the rotary shaft being configured to rotate the valve body;
   a link arm fixed to the rotary shaft outside the turbine housing;
   a connecting pin fixed to the link arm and having a central axis parallel to a central axis of the rotary shaft;
   a support member fixed to the connecting pin;
   an actuator;
   a drive rod having a first end connected to the actuator and a second end having an insertion hole, the connecting pin being inserted into the insertion hole in the drive rod, and the second end of the drive rod being connected to the link arm via the connecting pin in a state where the second end of the drive rod is pinched by the support member and the link arm to rotate with respect to the link arm;
   an elastic member configured to bias the drive rod in an extending direction of the central axis of the connecting pin; and
   a projecting portion provided at a position closer to the connecting pin than the elastic member is to the connecting pin, or at a position farther from the connecting pin than the elastic member is to the connecting pin,
   wherein the projecting portion is provided with at least one of the drive rod and the link arm,
   wherein the elastic member is at least one of sandwiched between the drive rod and the support member and sandwiched between the drive rod and the link arm,
   wherein the projecting portion protrudes in a direction toward at least one of the support member, the drive rod, and the link arm, and
   wherein the projecting portion includes a plurality of projecting portions, one of the plurality of projecting portions protrudes in a direction towards the support member, and an other of the plurality of projecting portions protrudes in a direction towards at least one of the drive rod and the link arm.

2. The waste gate valve device according to claim 1, wherein at least one of the plurality of projecting portions is integrally configured as a part of one of the support member, the link arm, and the drive rod.

3. The waste gate valve device according to claim 1, wherein:
   at least one of the plurality of projecting portions is fitted into a rod body of the drive rod; and
   the at least one of the plurality of projecting portions is disposed at a part of a cylindrical bush, the cylindrical bush constituting the insertion hole and the part protruding from the rod body.

4. The waste gate valve device according to claim 1, wherein the elastic member is a disk spring sandwiched between the support member and the link arm along with the drive rod with the connecting pin inserted into the disk spring.

5. The waste gate valve device according to claim 4, wherein at least one of the plurality of projecting portions has an annular shape about the connecting pin.

6. The waste gate valve device according to of claim 1, wherein:

the elastic member includes a plurality of elastic members, one of the plurality of elastic members is sandwiched between the drive rod and the support member, and an other of the plurality of elastic members is sandwiched between the drive rod and the link arm alike, the projecting portions are provided in at least one of the drive rod and the link arm, and each of the projecting portions is provided at the position closer to the connecting pin than the elastic member is to the connecting pin, or at the position farther from the connecting pin than the elastic member is to the connecting pin when the elastic member is sandwiched between the drive rod and the support member and when the elastic member is sandwiched between the drive rod and the link arm.

* * * * *